(12) United States Patent
Qiao et al.

(10) Patent No.: US 11,240,709 B2
(45) Date of Patent: Feb. 1, 2022

(54) DATA TRANSMISSION METHOD AND RELATED DEVICE

(71) Applicant: HUAWEI TECHNOLOGIES CO., LTD., Shenzhen (CN)

(72) Inventors: Yunfei Qiao, Hangzhou (CN); Chaolong Zhang, Hangzhou (CN); Jian Wang, Hangzhou (CN); Shengchen Dai, Hangzhou (CN); Rong Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 16/571,161

(22) Filed: Sep. 15, 2019

(65) Prior Publication Data

US 2020/0008099 A1 Jan. 2, 2020

Related U.S. Application Data

(63) Continuation of application No. PCT/CN2018/078796, filed on Mar. 13, 2018.

(30) Foreign Application Priority Data

Mar. 15, 2017 (CN) .......................... 201710152691.0

(51) Int. Cl.
*H04W 28/06* (2009.01)
*H04L 1/00* (2006.01)
*H04W 28/04* (2009.01)

(52) U.S. Cl.
CPC ......... *H04W 28/065* (2013.01); *H04L 1/0083* (2013.01); *H04L 1/0084* (2013.01); *H04W 28/04* (2013.01)

(58) Field of Classification Search
CPC ... H04W 28/065; H04W 28/04; H04W 28/06; H04L 1/0083; H04L 1/0084; H04L 1/00;
(Continued)

(56) References Cited

U.S. PATENT DOCUMENTS

2006/0062247 A1 3/2006 Li
2008/0225891 A1 9/2008 Cave et al.
(Continued)

FOREIGN PATENT DOCUMENTS

CN 1753545 A 3/2006
CN 102959891 A 3/2013
(Continued)

OTHER PUBLICATIONS

European Office Action issued in European Application No. 18 767 398.3 dated Feb. 24, 2021 (10 pages).

*Primary Examiner* — Afshawn M Towfighi (57) ABSTRACT

Embodiments provide a data transmission method and a related device. Under the method, after determining a first data packet to be sent to a receive end, a transmit end may generate a second data packet based on the first data packet, encode the second data packet, and send an encoded second data packet. A length of the second data packet is greater than a length of the first data packet. In various embodiments, when sending a data packet to the receive end, the transmit end may generate a longer data packet from a shorter data packet through combination, and send the longer data packet to the receive end after channel coding. In this way, a relatively high channel coding gain can be obtained during data transmission, and a relatively high bit error rate of short packet transmission is avoided, so that data transmission reliability can be improved.

17 Claims, 4 Drawing Sheets

(58) Field of Classification Search
CPC ... H04L 1/0007; H04L 1/0008; H04L 1/0009; H04L 1/0033
See application file for complete search history.

(56) References Cited

U.S. PATENT DOCUMENTS

| | | | |
|---|---|---|---|
| 2011/0010610 A1* | 1/2011 | Boariu | H04W 28/06 714/807 |
| 2012/0170675 A1 | 7/2012 | Li et al. | |
| 2012/0188931 A1* | 7/2012 | Lee | H04B 7/155 370/312 |
| 2013/0283037 A1 | 10/2013 | Katz et al. | |
| 2013/0294375 A1* | 11/2013 | Legg | H04W 72/04 370/329 |

FOREIGN PATENT DOCUMENTS

| | | |
|---|---|---|
| CN | 105337682 A | 2/2016 |
| WO | 2017004491 A1 | 1/2017 |

* cited by examiner

DATA TRANSMISSION METHOD AND RELATED DEVICE

CROSS-REFERENCE TO RELATED APPLICATIONS

This application is a continuation of International Application No. PCT/CN2018/078796, filed on Mar. 13, 2018, which claims priority to Chinese Patent Application No. 201710152691.0, filed on Mar. 15, 2017. The disclosures of the aforementioned applications are hereby incorporated by reference in their entireties.

TECHNICAL FIELD

The present invention relates to the field of communications technologies, and in particular, to a data transmission method and a related device.

BACKGROUND

Three types of scenarios are defined in a fifth generation (5th Generation, 5G) communications system and more possible subsequent communications systems: enhanced mobile broadband (enhanced Mobile Broadband, eMBB), ultra-reliable and low-latency communications (Ultra Reliable Low Latency Communications, URLLC), and massive machine-type communications (massive Machine Type Communications, mMTC). eMBB services mainly include an ultra-high-definition video, augmented reality (Augmented Reality, AR), virtual reality (Virtual Reality, VR), and the like. The eMBB services feature a large amount of to-be-transmitted data and a high transmission rate. URLLC services are mainly used in industrial automation, and the like in the Internet of Things. The URLLC services feature high reliability, a low latency, and abruptness. mMTC services are mainly used in smart grids and smart cities in the Internet of Things. The mMTC services feature massive device connections, a small amount of to-be-transmitted data, and tolerance for a relatively long latency.

In the prior art, a coding gain of channel coding increases with a code length. In some URLLC application scenarios, a length of a transmitted data packet is usually relatively short. For example, in scenarios such as industrial control and unmanned driving, a length of a data packet is usually less than 100 bits. A relatively high coding gain is difficult to obtain by using an existing coding scheme. Therefore, how to obtain a relatively high coding gain in the URLLC scenario to ensure high reliability of the URLLC service has become a problem to be urgently resolved.

SUMMARY

Embodiments of the present invention disclose a data transmission method and a related device, to obtain a relatively high channel coding gain and improve data transmission reliability in a URLLC scenario.

A first aspect of the embodiments of the present invention discloses a data transmission method. The method may include:

after determining a first data packet to be sent to a receive end, a transmit end may generate a second data packet based on the first data packet, encode the second data packet, and send an encoded second data packet, where a length of the second data packet is greater than a length of the first data packet.

The transmit end may be a network device, or may be a user terminal. Correspondingly, the receive end may be a user terminal, or may be a network device. When sending a data packet to the receive end, the transmit end may generate a longer data packet from a shorter data packet through combination, and send the longer data packet to the receive end after channel coding. In this way, a relatively high channel coding gain can be obtained during data transmission, and a relatively high bit error rate of short packet transmission is avoided, so that data transmission reliability can be improved.

Optionally, the transmit end may generate the second data packet based on the first data packet in the following several manners:

Manner 1:

The transmit end performs data padding on the first data packet according to a first padding rule to obtain the second data packet.

In the first padding rule, data "0" and/or "1" may be padded into the first data packet, so that a padded data packet can reach a specified length; or the first data packet may be repeated, so that a resulting data packet can reach a specified length. Manner 1 may be applied to uplink and downlink data transmission. Before encoding, a long packet is generated from a short packet by using a data padding or single-user repetition mechanism. This can avoid a high bit error rate or a high block error rate when the short packet is transmitted in a URLLC scenario. In this way, a transmission bit error rate can be reduced, and a requirement for high reliability of a URLLC-type service can be met.

Manner 2:

The transmit end determines a third data packet to be sent to a second receive end, and concatenates the first data packet with the third data packet to obtain the second data packet.

Manner 3:

After determining a third data packet to be sent to a second receive end, the transmit end may separately perform data padding on the third data packet and the first data packet according to a second padding rule, and concatenate a padded third data packet with a padded first data packet to obtain the second data packet.

Manner 4:

The transmit end determines a third data packet to be sent to a second receive end, and after concatenating the first data packet with the third data packet, performs data padding on a concatenated data packet according to a second padding rule to obtain the second data packet.

Manner 2 to Manner 4 may be applied to downlink data transmission, and the second receive end may be one or more receive ends other than the first receive end. Before encoding, a long packet is generated from a short packet by using a multi-user joint transmission mechanism. This can avoid a high bit error rate or a high block error rate when the short packet is transmitted in a URLLC scenario. In this way, a transmission bit error rate can be reduced, and a requirement for high reliability of a URLLC-type service can be met.

Optionally, after obtaining the first data packet, the transmit end may first determine the length of the first data packet, and if the length is less than a preset length threshold, generate the second data packet whose length is longer than that of the first data packet based on the first data packet.

Optionally, the transmit end may send related information of the second data packet to the receive end, where the related information is used to indicate the first data packet of the receive end.

It can be understood that, if the second data packet is obtained by concatenating the first data packet of the first receive end with the third data packet of the second receive end, the related information may separately indicate a location of the first data packet and a location of the third data packet in the second data packet, may separately indicate information such as start data and lengths of the first data packet and the third data packet, or may separately indicate an identifier of the first receive end and an identifier of the second receive end.

The related information may be carried in the second data packet, may be broadcast in a system, or may be sent to the receive ends, or the data packet locations, start data, and lengths, and the receive end identifiers of the respective receive ends may be sent to corresponding receive ends.

Further, if the second data packet is obtained by performing data padding on the first data packet, the related information may be used to indicate information such as a location, start data, and the length of the first data packet in the second data packet, or may be used to indicate an identifier of a receive end corresponding to the first data packet, and the like.

A second aspect of the embodiments of the present invention discloses a data transmission method. The method may include:

After receiving a second data packet sent by a transmit end, a receive end may decode the second data packet, to obtain a first data packet of the receive end from a decoded second data packet.

The second data packet is obtained by performing data padding on the first data packet or concatenating data of a plurality of receive ends. The transmit end may be a network device, or may be a user terminal. Correspondingly, the receive end may be a user terminal, or may be a network device. When sending a data packet to the receive end, the transmit end may generate a longer data packet from a shorter data packet through combination, and send the longer data packet to the receive end after channel coding. In this way, a relatively high channel coding gain can be obtained during data transmission, and a relatively high bit error rate of short packet transmission is avoided, so that the bit error rate can be reduced and data transmission reliability can be improved.

Optionally, the receive end may further receive related information of the second data packet sent by the transmit end, where the related information is used to indicate the first data packet of the receive end. Therefore, a specific manner in which the receive end obtains the first data packet of the receive end from the decoded second data packet may be:

obtaining, based on the related information, the first data packet indicated by the related information from the decoded second data packet.

The second data packet may be obtained by performing data padding on the first data packet and/or data concatenation on the first data packet and a data packet of another receive end. In this case, the related information may further indicate the data packet of the another receive end.

A third aspect of the embodiments of the present invention discloses a transmit end. The transmit end may be a network device, or may be a user terminal. Specifically, the transmit end may include a determining module, a generation module, an encoding module, and a sending module, and is configured to perform the data transmission method in the first aspect. When sending a data packet to a receive end, the transmit end generates a longer data packet from a shorter data packet through combination, and sends the longer data packet to the receive end after channel coding. In this way, a relatively high channel coding gain can be obtained during data transmission, and a relatively high bit error rate of short packet transmission is avoided, so that the bit error rate can be reduced and data transmission reliability can be improved.

A fourth aspect of the embodiments of the present invention discloses a receive end. The receive end may be a network device, or may be a user terminal. Specifically, the receive end may include a receiving module, a decoding module, and an obtaining module, and is configured to perform the data transmission method in the second aspect. When sending a data packet to the receive end, a transmit end generates a longer data packet from a shorter data packet through combination, and sends the longer data packet to the receive end after channel coding. In this way, a relatively high channel coding gain can be obtained during data transmission, and a relatively high bit error rate of short packet transmission is avoided, so that the bit error rate can be reduced and data transmission reliability can be improved.

A fifth aspect of the embodiments of the present invention discloses a network device, which may include a transceiver, a processor, and a memory, where the processor, the transceiver, and the memory are connected to each other. The transceiver is controlled by the processor to receive/send a message, the memory is configured to store a set of program code, and the processor is configured to invoke the program code stored in the memory to perform the data transmission method disclosed in the first aspect or the second aspect.

A sixth aspect of the embodiments of the present invention discloses a user terminal, which may include an input device, an output device, a processor, and a memory, where the input device, the output device, the processor, and the memory may be connected to each other by using a bus. The input device and the output device are controlled by the processor to receive/send a message, the memory is configured to store a set of program code, and the processor is configured to invoke the program code stored in the memory to perform the data transmission method disclosed in the first aspect or the second aspect.

The embodiments of the present invention bring the following beneficial effects:

In the embodiments of the present invention, when sending a data packet to the receive end, the transmit end may generate a longer data packet from a shorter data packet through combination, and send the longer data packet to the receive end after channel coding. In this way, a relatively high channel coding gain can be obtained during URLLC data transmission, so that data transmission reliability is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following describes the embodiments of the present invention with reference to the accompanying drawings.

The embodiments of the present invention disclose a data transmission method and a related device, to obtain a relatively high channel coding gain and improve data transmission reliability in a URLLC scenario.

Figure 1:
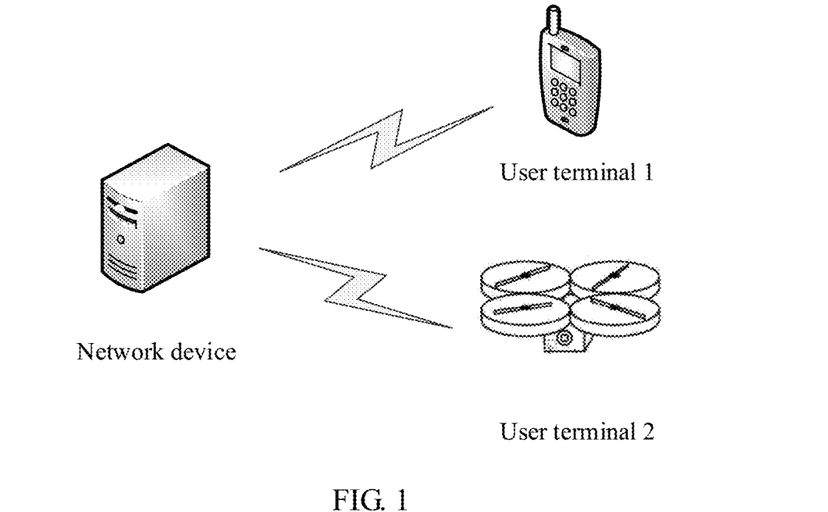
FIG. 1 is a schematic diagram of a network architecture according to an embodiment of the present invention.

To better understand the data transmission method and the related device disclosed in the embodiments of the present invention, the following first describes a network architecture applicable to the embodiments of the present invention. FIG. 1 is a schematic diagram of a network architecture according to an embodiment of the present invention. The architecture shown in FIG. 1 may include a network device and at least one user terminal. The network device may include but is not limited to a base station, a radio network controller, a base station controller, and the like. The user terminal may include but is not limited to a mobile phone, a tablet computer, a personal digital assistant (Personal Digital Assistant, PDA), a mobile Internet device (Mobile Internet Device, MID), an in-vehicle terminal, an unmanned aerial vehicle, and the like. By using the network architecture shown in FIG. 1, before sending downlink data to the user terminal, the network device needs to perform channel coding on a to-be-sent data packet, to transmit the data packet to the user terminal. The user terminal obtains the data by decoding the data packet. Similarly, before sending uplink data to the network device, the user terminal also performs channel coding on a to-be-sent data packet, to transmit the data packet to the network device. The network device obtains the data by decoding the data packet. A transmitted data packet may be control information, may be data information, or may be a combination of control information and data information. This is not limited in this embodiment of the present invention. Uplink and downlink data transmission can be implemented between the network device and the user terminal by using the network architecture shown in FIG. 1.

Figure 2:
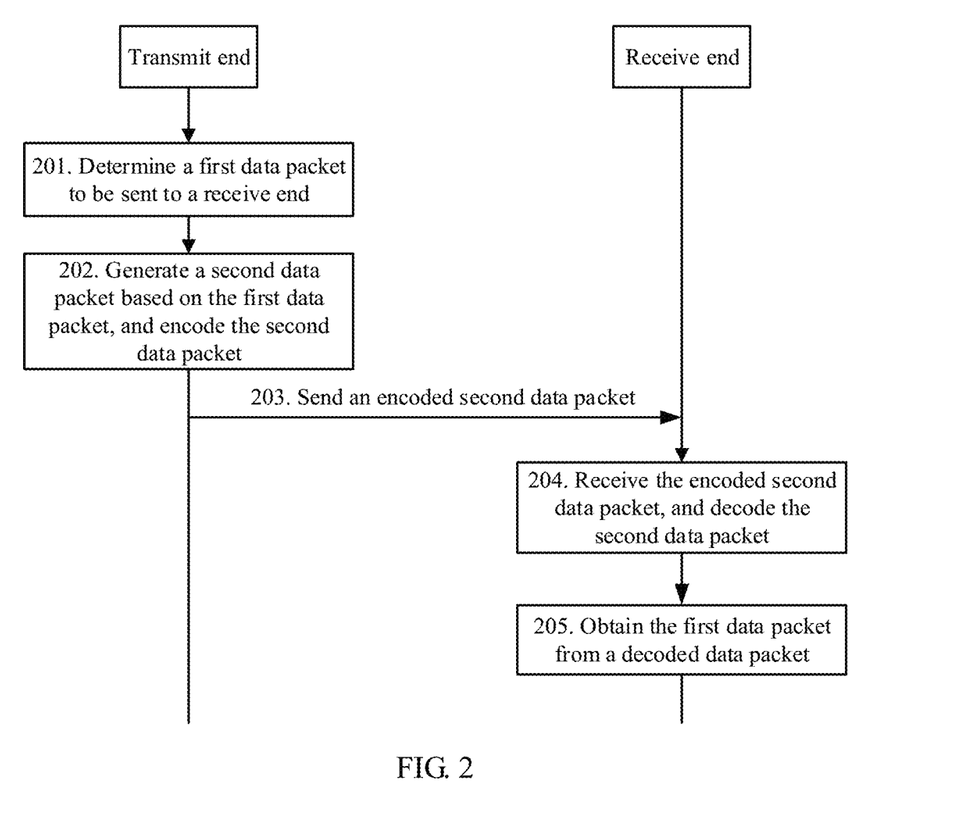
FIG. 2 is a schematic flowchart of a data transmission method according to an embodiment of the present invention.

Based on the network architecture shown in FIG. 1, an embodiment of the present invention discloses a data transmission method. FIG. 2 is a schematic flowchart of a data transmission method according to an embodiment of the present invention. The method in FIG. 2 may be applied to a network device, or may be applied to a user terminal. As shown in FIG. 2, the method may include the following steps.

201. A transmit end determines a first data packet to be sent to a receive end.

The transmit end may be a network device, or may be a user terminal. Correspondingly, the receive end may be a user terminal, or may be a network device. In other words, data transmission mentioned in this solution may be uplink data transmission, or may be downlink data transmission. This is not limited in this embodiment of the present invention.

In this embodiment of the present invention, when the transmit end is a network device and the receive end is a user terminal, before the network device determines the first data packet to be sent to the user terminal, the user terminal may send a data request to the network device. The network device determines a to-be-sent data packet based on the data request. When the transmit end is a user terminal and the receive end is a network device, before determining to send the first data packet to the network device, the user terminal may obtain a grant for uplink data transmission from the network device, and determine a to-be-sent data packet when the grant is obtained. Alternatively, other manners may be used. For example, information is sent to the network device independently, to indicate a manner used for data transmission, for example, generating long packet data from short packet data.

In some implementations, after obtaining the first data packet, the transmit end may first determine a length of the first data packet, and if the length is less than a preset length threshold, generate a second data packet whose length is longer than that of the first data packet based on the first data packet.

The preset length threshold is a length threshold preset by the transmit end. In a URLLC scenario, the preset length threshold may be 50 bits, 60 bits, or 100 bits. This is not limited in this embodiment of the present invention. For example, a base station needs to send 60-bit data to a user terminal based on a request of the user terminal. If the preset length threshold is 50 bits, the base station may directly perform channel coding on the data and transmit the data to the user terminal. If the preset length threshold is 100 bits, the base station needs to perform data padding on the data, or repeat the data twice, or concatenate data (assuming that a length is also 60 bits) of another user terminal with the data of the user terminal. In this way, a 120-bit data packet is obtained, and then transmitted to the user terminal after channel coding. In a narrowband Internet of things (Narrowband Internet of Things, NB-IoT) scenario, if a user terminal needs to send 1-bit data to a base station, the user terminal may perform data padding on the data, or repeat the data for 20 times to perform concatenation. In this way, a 20-bit data packet is obtained, and then transmitted to the base station after channel coding.

202. The transmit end generates a second data packet based on the first data packet, and encodes the second data packet.

In this embodiment of the present invention, after determining the to-be-sent first data packet, the transmit end may generate the second data packet from the first data packet, where the length of the generated second data packet is greater than the length of the first data packet.

In some implementations, the transmit end may generate the second data packet based on the first data packet in the following several manners:

Manner 1:

The transmit end performs data padding on the first data packet according to a first padding rule to obtain the second data packet.

Manner 2:

When the transmit end is a network device, the receive end is a user terminal, and the first data packet is a data packet of a first receive end, the transmit end determines a third data packet to be sent to a second receive end, and concatenates the first data packet with the third data packet to obtain the second data packet.

Manner 3:

When the transmit end is a network device, the receive end is a user terminal, and the first data packet is a data packet of a first receive end, after determining a third data packet to be sent to a second receive end, the transmit end may separately perform data padding on the third data packet and the first data packet according to a second padding rule, and concatenate a padded third data packet with a padded first data packet to obtain the second data packet.

Manner 4:

When the transmit end is a network device, the receive end is a user terminal, and the first data packet is a data packet of a first receive end, the transmit end determines a third data packet to be sent to a second receive end, and after concatenating the first data packet with the third data packet, performs data padding on a concatenated data packet according to a second padding rule to obtain the second data packet.

Figure 3A:
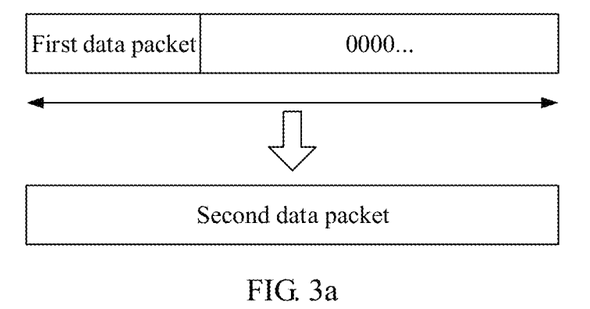
FIG. 3a is a schematic structural diagram of a second data packet according to an embodiment of the present invention.
Figure 3B:
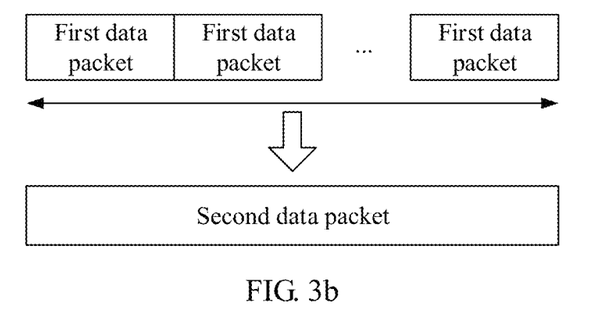
FIG. 3b is a schematic structural diagram of another second data packet according to an embodiment of the present invention.

For Manner 1, the transmit end may be a network device, or may be a user terminal. In the first padding rule, data "0" and/or "1" may be padded into the first data packet, so that a padded data packet can reach a specified length. For example, as shown in FIG. 3a, after padding full "0" data into the first data packet, the transmit end obtains the second data packet. Alternatively, in the first padding rule, the first data packet may be repeated, so that a resulting data packet can reach a specified length. For example, as shown in FIG. 3b, the transmit end repeats a to-be-sent data packet once or a plurality of times, to generate a longer data packet. In different scenarios and for data packets with different lengths, a quantity of repetition times may be different. This is not limited in this embodiment of the present invention. For example, in the URLLC scenario, the base station may repeat the 60-bit information sent to the user terminal twice, to generate 120-bit information, or may pad data "0" or "1" into the first data packet. This is not limited in this embodiment of the present invention. Similarly, before sending the data to the base station, the user terminal may repeat the data of the user terminal a plurality of times, to generate a long data packet from a short data packet.

For Manner 2 to Manner 4, the transmit end is a network device, and the first receive end and the second receive end are user terminals. In some embodiments, the first receive end is a first user terminal, and the second receive end is a second user terminal. The second user terminal may be a user terminal other than the first user terminal, or may be a plurality of user terminals other than the first user terminal.

In some embodiments, the second user terminal may be a user terminal to which the network device is to send a data packet, and may be or may not be in a same cell as the first user terminal, or may be within a specific distance range from the first user terminal, for example, a range of 1 km. Third data packets of the second user terminals may be the same or may be different. This is not limited in this embodiment of the present invention.

Figure 3C:
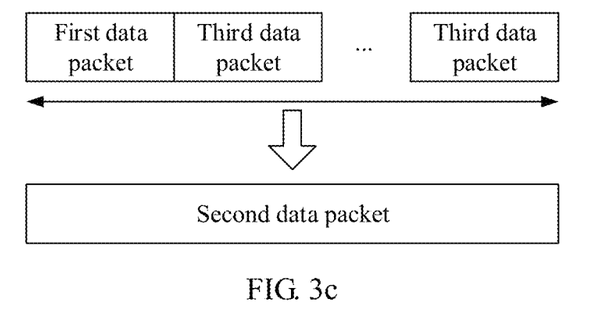
FIG. 3c is a schematic structural diagram of still another second data packet according to an embodiment of the present invention.

For Manner 2, the second data packet may be obtained by concatenating a first data packet with a plurality of third data packets. FIG. 3c merely shows a schematic concatenation manner, and the first data packet may be located at any location in the second data packet. In some embodiments, the second data packet may be obtained by concatenating one first data packet with one third data packet, or may be obtained from a plurality of first data packets and at least one third data packet. This is not intended to be limiting.

Figure 3D:
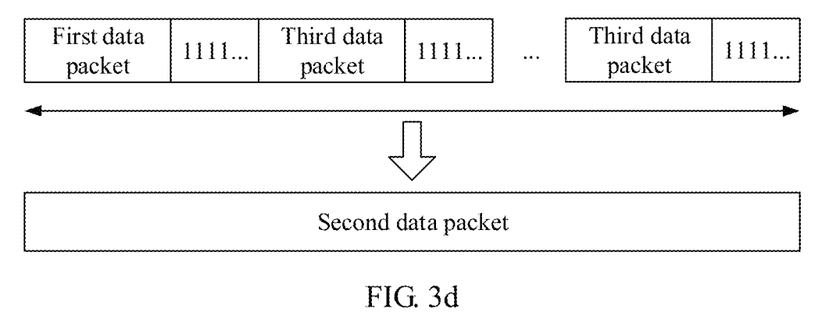
FIG. 3d is a schematic structural diagram of still another second data packet according to an embodiment of the present invention.

For Manner 3, with reference to Manner 1 and Manner 2, the transmit end separately performs data padding on the first data packet and the second data packet according to the second padding rule, and then concatenates the padded first data packet with the padded third data packet to obtain the second data packet, as shown in FIG. 3d. It can be understood that the second padding rule may be the same as the first padding rule. The transmit end separately performs data padding on the first data packet and the third data packet according to the second padding rule, so that a length of the padded first data packet and a length of the padded third data packet may be the same, and reach a specified length. For example, the length of the first data packet is 30 bits, a length of the third data packet is 40 bits. If in the second padding rule, a data packet may be padded so that a length of a resulting data packet reaches 50 bits, 20-bit data needs to be padded into the first data packet, and 10-bit data needs to be padded into the third data packet. Alternatively, if in the second padding rule, data of a specified length may be padded in a data packet, for example, 10-bit data separately padded into the first data packet and the third data packet, the length of the padded first data packet is 40 bits, and the length of the padded third data packet is 50 bits. This is not limited in this embodiment of the present invention.

Figure 3E:
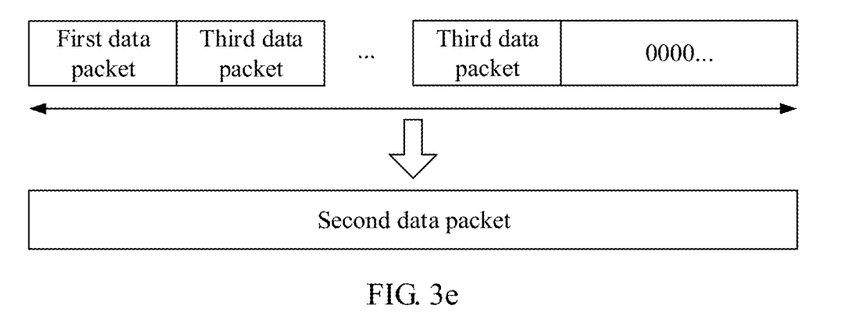
FIG. 3e is a schematic structural diagram of still another second data packet according to an embodiment of the present invention.

For Manner 4, with reference to Manner 1 and Manner 2, after concatenating the first data packet with the third data packet, the transmit end performs data padding on the concatenated data packet according to the second padding rule, to obtain the second data packet, as shown in FIG. 3e. It can be understood that the second padding rule may be the same as the first padding rule.

In this embodiment of the present invention, a data padding or single-user repetition mechanism is used in Manner 1 and a multi-user joint transmission mechanism is used in Manner 2 to Manner 4, to generate a long data packet from a short data packet. This can avoid a high bit error rate or a high block error rate when the short packet is transmitted in a URLLC scenario. In this way, a requirement for high reliability of a URLLC-type service can be met.

Therefore, after generating, based on the first data packet, the second data packet whose length is greater than that of the first data packet, the transmit end performs channel coding on the second data packet, for example, using a polar code (polar code) encoding technology or a low density parity check code (Low Density Parity Check Code, LDPC) encoding technology, to obtain an encoded data packet.

203. The transmit end sends an encoded second data packet to the receive end.

It can be understood that, at a same bit rate, performance of short packet transmission is inferior to that of long packet transmission. For example, a bit error rate of the short packet transmission is relatively high. Therefore, the transmit end generates long packet data from to-be-sent short packet data through concatenation or padding, and then performs channel coding on the long packet data before transmission. In this way, better transmission performance can be obtained, and a transmission bit error rate can be reduced.

In this embodiment of the present invention, when the second data packet is obtained through concatenation of data packets of a plurality of user terminals, the network device sends the second data packet to all user terminals. For example, when the second data packet is obtained by concatenating a data packet of the first user terminal and a data packet of the second user terminal, the base station may send the second data packet to the first user terminal and the second user terminal.

204. The receive end receives the encoded second data packet, and decodes the second data packet.

205. The receive end obtains the first data packet from a decoded data packet.

In this embodiment of the present invention, after receiving the data packet, the receive end may decode the data packet, and then obtain a data packet of the receive end from the decoded data packet.

In some implementations, the transmit end may send related information of the second data packet to the receive end, where the related information is used to indicate the first data packet of the receive end.

It can be understood that, if the second data packet is obtained by concatenating the first data packet of the first receive end and the third data packet of the second receive end, the related information may separately indicate a location of the first data packet and a location of the third data packet in the second data packet, may separately indicate information such as start data and lengths of the first data packet and the third data packet, or may separately indicate an identifier of the first receive end and an identifier of the second receive end (such as an identifier ID and a media access control (Media Access Control, MAC) address). This is not intended to be limiting. After receiving and decoding the second data packet, the receive end may obtain, based on the identifier of the receive end, data belonging to the receive end. The related information may be carried in the second data packet, may be broadcast in a system, or may be sent to the receive ends, or the data packet locations, start data, and lengths, and the receive end identifiers of the respective receive ends may be sent to corresponding receive ends. This is not limited in this embodiment of the present invention.

Further, if the second data packet is obtained by performing data padding on the first data packet, the related information may be used to indicate information such as a location, start data, and the length of the first data packet in the second data packet, or may be used to indicate an identifier of a receive end corresponding to the first data packet, and the like. This is not limited in this embodiment of the present invention.

In some embodiments, the transmit end may also notify the receive end of a location of the first data packet or identifier information of the first data packet in advance. After receiving the encoded second data packet, the receive end directly decodes the indicated data packet based on the location, or detects the encoded second data packet based on the identifier information, and directly decodes the first data packet after the first data packet is detected. In this manner, decoding of redundant data can be avoided, and data obtaining efficiency can be improved.

It can be learned that in the method in FIG. 2, when sending a data packet to the receive end, the transmit end may generate a longer data packet from a shorter data packet through concatenation or padding, and send the longer data packet to the receive end after channel coding. In this way, a relatively high channel coding gain can be obtained during URLLC data transmission, and a relatively high bit error rate of short packet transmission is avoided, so that data transmission reliability is improved.

Figure 4:
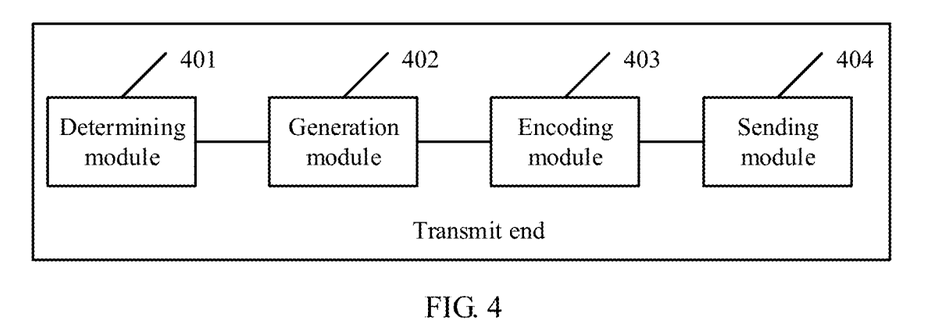
FIG. 4 is a schematic structural diagram of a transmit end according to an embodiment of the present invention.

Based on the network architecture shown in FIG. 1, an embodiment of the present invention discloses a transmit end. FIG. 4 is a schematic structural diagram of a transmit end according to an embodiment of the present invention. The transmit end in FIG. 4 may be applied to a network device, or may be applied to a user terminal. As shown in FIG. 4, the transmit end may include the following modules:

a determining module 401, configured to determine a first data packet to be sent to a first receive end;

a generation module 402, configured to generate a second data packet based on the first data packet, where a length of the second data packet is greater than a length of the first data packet;

an encoding module 403, configured to encode the second data packet; and a sending module 404, configured to send an encoded second data packet.

In some implementations, the generation module 402 may generate the second data packet based on the first data packet in the following several example manners:

Manner 1:

Perform data padding on the first data packet according to a first padding rule to obtain the second data packet.

Manner 2:

When the transmit end is a network device and the receive end is a user terminal, the generation module 402 determines a third data packet to be sent to a second receive end, and concatenates the first data packet with the third data packet to obtain the second data packet.

Manner 3:

When the transmit end is a network device and the receive end is a user terminal, after determining a third data packet to be sent to a second receive end, the generation module 402 may separately perform data padding on the third data packet and the first data packet according to a second padding rule, and concatenate a padded third data packet with a padded first data packet to obtain the second data packet.

Manner 4:

When the transmit end is a network device and the receive end is a user terminal, the generation module 402 determines a third data packet to be sent to a second receive end, and after concatenating the first data packet with the third data packet, performs data padding on a concatenated data packet according to a second padding rule to obtain the second data packet.

For Manner 2 to Manner 4, the sending module 404 may send the encoded second data packet to the first receive end and the second receive end.

In some implementations, the determining module 401 is further configured to determine the length of the first data packet, and when the length of the first data packet is less than a preset length threshold, trigger the generation module 402 to execute the operation of generating the second data packet based on the first data packet.

In some implementations, the sending module 404 is further configured to send related information of the second data packet, where the related information is used to indicate the first data packet of the first receive end.

Further, if the second data packet is obtained by concatenating the first data packet with the third data packet, the related information may be further used to indicate the third data packet of the second receive end.

It can be learned from the description of the transmit end in FIG. 4 that, when sending a data packet to the receive end, the transmit end may generate a longer data packet from a shorter data packet through concatenation or padding, and send the longer data packet to the receive end after channel coding. In this way, a relatively high channel coding gain can be obtained during URLLC data transmission, and a relatively high bit error rate of short packet transmission is avoided, so that data transmission reliability is improved.

Figure 5:
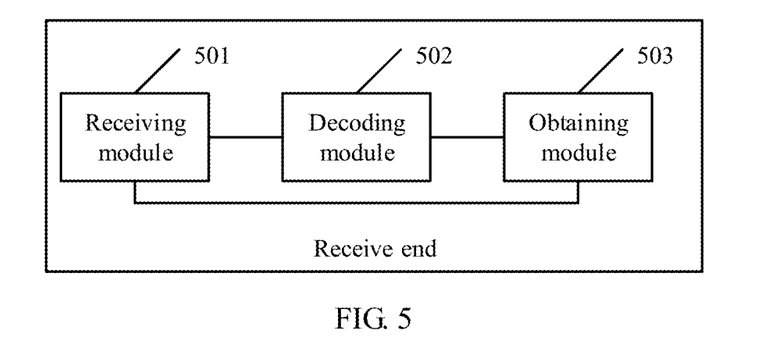
FIG. 5 is a schematic structural diagram of a receive end according to an embodiment of the present invention.

Based on the network architecture shown in FIG. 1, an embodiment of the present invention discloses a receive end. FIG. 5 is a schematic structural diagram of a receive end according to an embodiment of the present invention. The receive end in FIG. 5 may be applied to a network device, or may be applied to a user terminal. As shown in FIG. 5, the receive end may include the following modules:

a receiving module 501, configured to receive a second data packet sent by a transmit end;

a decoding module 502, configured to decode the second data packet; and an obtaining module 503, configured to obtain a first data packet of the receive end from a decoded second data packet.

In some embodiments, the receiving module 501 is further configured to receive related information of the second data packet sent by the transmit end, where the related information is used to indicate the first data packet of the receive end.

Therefore, a specific manner in which the obtaining module 503 obtains the first data packet of the receive end from the decoded second data packet may be:

obtaining, based on the related information, the first data packet indicated by the related information from the decoded second data packet.

The second data packet may be obtained by performing data padding on the first data packet and/or data concatenation on the first data packet and a data packet of another receive end. In this case, the related information may further indicate the data packet of the another receive end.

It can be learned from the description of the receive end in FIG. 5 that, after receiving the second data packet obtained by the transmit end by performing data padding or concatenating data of a plurality of receive ends, the receive end may obtain a data packet of the receive end from the decoded second data packet. A relatively high bit error rate of short packet transmission can be avoided by encoding a long packet before transmission, so that a bit error rate can be reduced and data transmission reliability can be improved.

Figure 6:
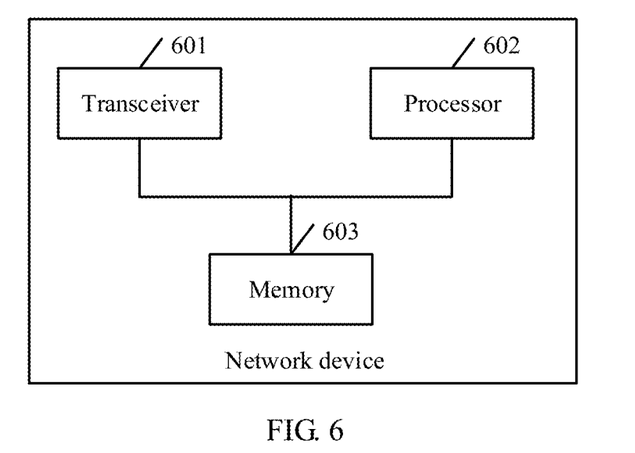
FIG. 6 is a schematic structural diagram of a network device according to an embodiment of the present invention.

Based on the network architecture shown in FIG. 1, an embodiment of the present invention discloses a network device. FIG. 6 is a schematic structural diagram of a network device according to an embodiment of the present invention. The network device in FIG. 6 may be the transmit end shown in FIG. 4, or may be the receive end shown in FIG. 5. As shown in FIG. 6, the network device may include a transceiver 601, a processor 602, and a memory 603.

For example, the processor 602 may include a central processing unit (CPU) or an application-specific integrated circuit (Application Specific Integrated Circuit, ASIC), may include one or more integrated circuits configured to control program execution, may include a hardware circuit developed by using a field programmable gate array (Field Programmable Gate Array, FPGA), or may include a baseband chip.

There may be one or more memories 603. The memory 603 may include a read-only memory (Read Only Memory, ROM), a random access memory (Random Access Memory, RAM), a magnetic disk memory, and the like. The memory 603 may be configured to store an instruction required by the processor 602 to execute a task, and may be further configured to store data.

The transceiver 601 may belong to a radio frequency system, and is configured to perform network communication with an external device. For example, the transceiver 601 may communicate with the external device by using a network such as an Ethernet, a radio access network, or a wireless local area network.

The transceiver 601, the memory 603, and the processor 602 are connected to each other.

The processor 602 is designed and programmed to build code corresponding to the foregoing methods into a chip, so that when being operated, the chip can perform the methods in the foregoing embodiments. How to design and program the processor 602 is a technology known to a person skilled in the art. Details are not described herein.

The network device may be configured to perform the method in FIG. 1, and may be a transmit end, or may be a receive end. Therefore, for functions and the like implemented by the units of the network device, refer to the description of the foregoing methods. Details are not described again.

It can be understood that in actual application, an entity device corresponding to the determining module 401, the generation module 402, and the encoding module 403 of the transmit end in FIG. 4, or the decoding module 502 and the obtaining module 503 of the receive end in FIG. 5 may be the processor 602 in FIG. 6. An entity device corresponding to the sending module 404 of the transmit end in FIG. 4 or the receiving module 501 of the receive end in FIG. 5 may be the transceiver 601 in FIG. 6.

Figure 7:
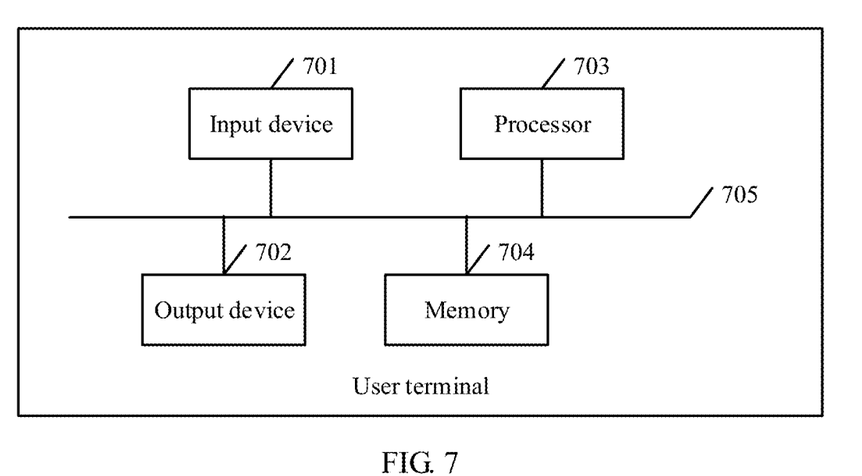
FIG. 7 is a schematic structural diagram of a user terminal according to an embodiment of the present invention.

Based on the network architecture shown in FIG. 1, an embodiment of the present invention discloses a user terminal. FIG. 7 is a schematic structural diagram of a user terminal according to an embodiment of the present invention. The user terminal in FIG. 7 may be the transmit end shown in FIG. 4, or may be the receive end shown in FIG. 5. As shown in FIG. 7, the user terminal may include: at least one input device 701, at least one output device 702, at least one processor 703, and a memory 704, where the input device 701, the output device 702, the processor 703, and the memory 704 are connected to each other by a bus 705.

For example, the output device 702 may be a screen/interface used for outputting, such as a display (Display) and a touchscreen. For example, the input device 701 may be a keyboard (Keyboard) used for inputting, a mouse, a camera for capturing an image, an earpiece and a speaker for playing a sound signal, and a touchscreen for detecting a touch operation. It should be noted that the display and the touchscreen may be in an integrated design, and the keyboard may be an entity keyboard, or may be a virtual touchscreen keyboard, or may be a keyboard that combines an entity keyboard and a virtual touchscreen keyboard. The output device 702 and the input device 701 may alternatively be a transceiver, configured to perform network communication with an external device. For example, the output device 702 and the input device 701 may communicate with the external device by using a network such as an Ethernet, a radio access network, or a wireless local area network.

For example, the processor 703 may include a CPU or an ASIC, may include one or more integrated circuits configured to control program execution, may include a hardware circuit developed by using an FPGA, or may include a baseband chip.

There may be one or more memories 704. The memory 704 may include a ROM, a RAM, a magnetic disk memory, and the like. The memory 704 may be configured to store an instruction required by the processor 703 to execute a task, and may be further configured to store data.

The processor 703 is designed and programmed to build code corresponding to the foregoing methods into a chip, so that when being operated, the chip can perform the methods in the foregoing embodiments. How to design and program the processor 703 is a technology known to a person skilled in the art. Details are not described herein.

The user terminal may be configured to perform the method in FIG. 1, and may be a transmit end, or may be a receive end. Therefore, for functions and the like implemented by the units of the user terminal, refer to the description of the foregoing methods. Details are not described again.

It can be understood that in actual application, an entity device corresponding to the determining module 401, the generation module 402, and the encoding module 403 of the transmit end in FIG. 4, or the decoding module 502 and the obtaining module 503 of the receive end in FIG. 5 may be the processor 703 in FIG. 7. An entity device corresponding to the sending module 404 of the transmit end in FIG. 4 may be the output device 702 in FIG. 7, and an entity device corresponding to the receiving module 501 of the receive end in FIG. 5 may be the input device 701 in FIG. 7.

It should be noted that in the foregoing embodiments, the descriptions of the embodiments have respective focuses. For a part that is not described in detail in an embodiment, refer to related description in other embodiments. In addition, a person skilled in the art should also appreciate that all the embodiments described in the specification are preferred embodiments, and the related actions and modules are not necessarily mandatory to the present invention.

The steps in the method in the embodiments of the present invention may be adjusted, combined, or deleted depending on an actual need.

The modules of the transmit end and the receive end in the embodiments of the present invention may be combined, divided, or deleted depending on an actual need.

The transmit end and the receive end in the embodiments of the present invention may be executed by a universal integrated circuit such as a CPU (Central Processing Unit, central processing unit), or an ASIC (Application Specific Integrated Circuit, application-specific integrated circuit).

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disc, a read-only memory (Read-Only Memory, ROM), a random access memory (Random Access Memory, RAM), or the like.

The data transmission method and the related device disclosed in the embodiments of the present invention are described in detail above. Principles and implementations of the present invention are described herein by using specific instances. The description of the foregoing embodiments is merely provided to help understand the present invention and core ideas of the present invention. In addition, a person of ordinary skill in the art can make variations to the present invention in terms of the specific implementations and application scopes according to the ideas of the present invention. Therefore, the content of the specification shall not be construed as a limit to the present invention.

What is claimed is:

1. A data transmission method, comprising:
    determining, by a transmit end, a first data packet to be sent to a first receive end;
    generating, by the transmit end, a second data packet based on the first data packet and further including information to be sent to a second receive end, wherein a length of the second data packet is greater than a length of the first data packet; and
    encoding, by the transmit end, the second data packet, and sending an encoded second data packet; and, wherein generating, by the transmit end, the second data packet based on the first data packet comprises:
    repeating the first data packet to generate the second data packet.

2. The method according to claim 1, wherein generating, by the transmit end, the second data packet based on the first data packet comprises:
    determining, by the transmit end, a third data packet to be sent to the second receive end; and
    concatenating, by the transmit end, the first data packet with the third data packet to obtain the second data packet.

3. The method according to claim 1, wherein generating, by the transmit end, the second data packet based on the first data packet comprises:
    performing, by the transmit end, data padding on the first data packet according to a first padding rule to obtain the second data packet.

4. The method according to claim 2, wherein after determining, by the transmit end, the third data packet to be sent to a second receive end, the method further comprises:
    separately performing, by the transmit end, data padding on the third data packet and the first data packet according to a second padding rule; and
    the concatenating, by the transmit end, the first data packet with the third data packet to obtain the second data packet comprises:
    concatenating, by the transmit end, a padded third data packet with a padded first data packet to obtain the second data packet.

5. The method according to claim 2, wherein concatenating, by the transmit end, the first data packet with the third data packet to obtain the second data packet comprises:
    concatenating, by the transmit end, the first data packet with the third data packet, and performing data padding on a concatenated data packet according to a second padding rule to obtain the second data packet.

6. The method according to claim 1, wherein after obtaining, by a transmit end, the first data packet of the first receive end, the method further comprises:
    determining, by the transmit end, the length of the first data packet, and when the length of the first data packet is less than a preset length threshold, executing the operation of generating the second data packet based on the first data packet.

7. The method according to claim 1, wherein the method further comprises:

sending, by the transmit end, related information of the second data packet, wherein the related information indicates the first data packet for the first receive end.

8. The data transmission method of claim 1 wherein the first receive end comprises a first terminal and the second receive end comprises a second terminal different from the first terminal.

9. The data transmission method of claim 1 wherein the first receive end comprises a first receiver station and the second receive end comprises a second receiver station different from the first receiver station.

10. A transmit apparatus, comprising:
at least one processor configured to determine a first data packet to be sent to a first receive end;
the at least one processor configured to generate a second data packet based on the first data packet and further including information to be sent to a second receive end, wherein a length of the second data packet is greater than a length of the first data packet;
an encoder configured to encode the second data packet; and
a transmitter configured to send an encoded second data packet; and, wherein generating, by the transmit apparatus, the second data packet based on the first data packet comprises:
repeating the first data packet to generate the second data packet.

11. The transmit apparatus according to claim 10, wherein the at least one processor is configured to generate the second data packet based on the first data packet by performing operations comprising:
determining a third data packet to be sent to the second receive end; and
concatenating the first data packet with the third data packet to obtain the second data packet.

12. The transmit apparatus according to claim 10, wherein the at least one processor is configured to generate the second data packet based on the first data packet by performing operations comprising:
performing data padding on the first data packet according to a first padding rule to obtain the second data packet.

13. The transmit apparatus according to claim 12, wherein the at least one processor is further configured to separately perform data padding on the third data packet and the first data packet according to a second padding rule; and, wherein concatenating the first data packet with the third data packet to obtain the second data packet comprises:
concatenating a padded third data packet with a padded first data packet to obtain the second data packet.

14. The transmit apparatus according to claim 12, wherein the at least one processor is configured to concatenate the first data packet with the third data packet to obtain the second data packet by performing operations comprising:
concatenating the first data packet with the third data packet, and performing data padding on a concatenated data packet according to a second padding rule to obtain the second data packet.

15. The transmit apparatus according to claim 10, wherein the at least one processor is further configured to determine the length of the first data packet, and when the length of the first data packet is less than a preset length threshold, trigger execution of the operation of generating the second data packet based on the first data packet.

16. The transmit apparatus according to claim 10, wherein the transmitter is further configured to send related information of the second data packet, wherein the related information is used to indicate information related to the first data packet for the first receive end.

17. A data transmission system comprising:
a processor, and
a memory connected to the processor, the memory storing instructions that when executed by the processor control the processor to perform operations comprising:
(a) testing a first data packet to be sent to a first terminal to determine if the first data packet has a requisite length; and
(b) conditioned on results of the testing, selectively generating a second data packet having a length greater than a length of the first data packet, the second data packet including the first data packet to be sent to a first terminal and further including additional information to be sent to a second terminal different from the first terminal, and
a transmitter connected to the processor, the transmitter transmitting the second data packet instead of the first data packet, the transmitted second data packet containing both (i) information for the first terminal and (ii) information for the second terminal.

* * * * *